July 9, 1935.　　　　S. I. BERGER　　　　2,007,361
BEVERAGE MIXER
Filed Dec. 13, 1934　　　2 Sheets-Sheet 1
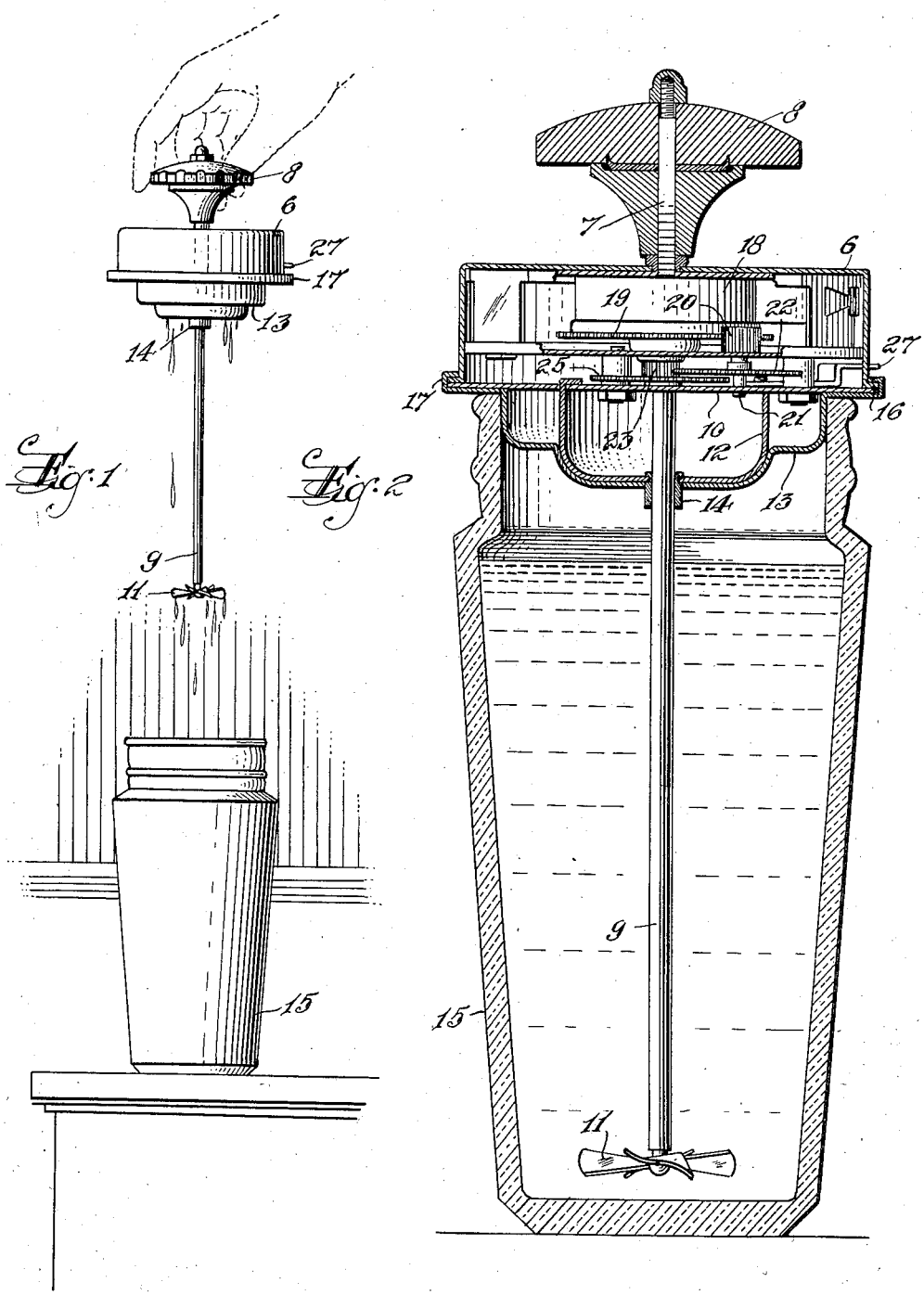
INVENTOR
Samuel I. Berger.
BY Fredk C. Fischer.
ATTORNEY

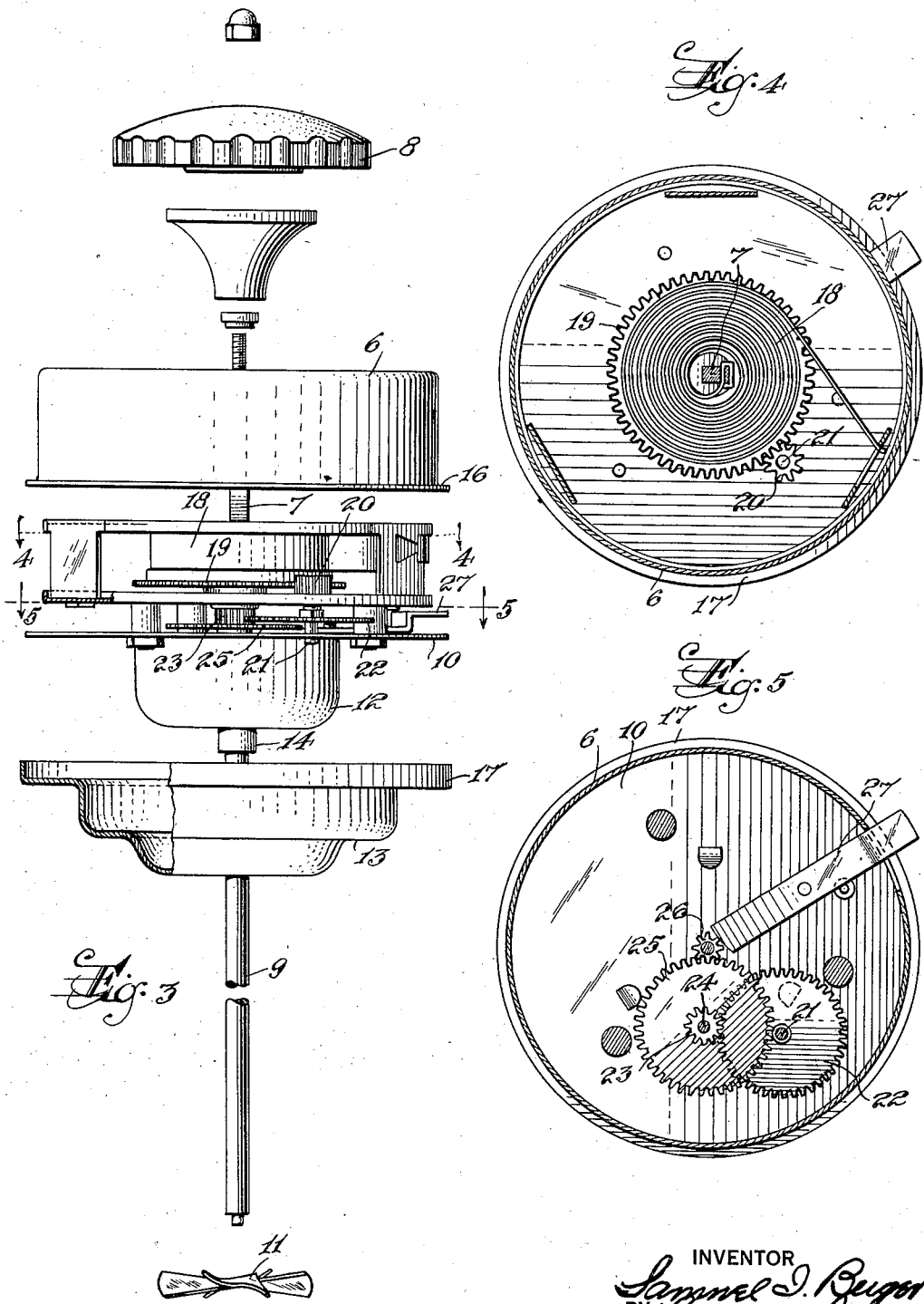

Patented July 9, 1935

2,007,361

UNITED STATES PATENT OFFICE 2,007,361

BEVERAGE MIXER

Samuel I. Berger, Newark, N. J.

Application December 13, 1934, Serial No. 757,308

3 Claims. (Cl. 259—122)

This invention relates to devices especially adapted for mixing various liquids, such as malted milk, iced drinks, eggnog, or for beating various substances, such as whipped cream, eggs or the like.

Heretofore in devices of this character, the mixing means have been operated by a spring motor provided in a casing positioned above the receptacle in which the substances being mixed were placed. In order to prevent the substances being mixed from rising into the casing containing the spring motor, it is necessary to provide a baffle plate, which generally is made of some thin metal. Heretofore, such baffle plates were susceptible of being easily bent during the rapid or careless attaching of the mixing device to a receptacle such as a glass jar; and when the baffle plate became bent, it soon ceased to function as an effective barrier to prevent the liquids and other substances being mixed from entering the casing containing the spring motor.

It is, therefore, an object of this invention, to provide a mixing device having a baffle plate provided with reenforcing means to prevent it from being easily bent and at the same time enabling the mixing device to snugly fit into receptacles such as glass jars and the like.

A further object is the provision of a novel construction for assembling a casing containing a spring motor and a baffle plate.

These and other advantageous objects, which will later appear, are accomplished by the simple and practical construction and arrangement of parts hereinafter described and exhibited in the accompanying drawings, forming part hereof, and in which:

Fig. 1 is a view showing the manner in which my mixing device is applied to a receptacle, Fig. 2 is a cross sectional view showing the mixing device attached to a receptacle, Fig. 3 is an exploded elevational view showing details of the mixing device, Fig. 4 is a sectional view taken on the line 4—4 of Fig. 3, and Fig. 5 is a sectional view taken on the line 5—5 of Fig. 3.

Referring to the drawings, my device is shown to comprise a casing 6 in which is contained a spring motor of a well known type, the latter being connected with an upper winding shaft 7 attached to a knob 8. An operating shaft 9 is attached to the lower part of the motor and projects through a bottom supporting plate 10 and is provided at its lower end with a stirrer 11. Depending from the plate 10 is a reenforcing cup-shaped member 12 which engages a baffle plate 13, the latter being shaped according to the form or shape of the bottom of the cup 12, said baffle forming substantially the lower plate of the casing 6. Fixed to the cup 12 and to the baffle plate 13 is a bushing 14 through which passes the shaft 9, the bushing providing a substantially water-tight joint to effectively prevent liquids from moving upwardly into contact with the spring motor. As will be seen, in the event that any liquid does rise above the bushing 14, it will be held in the cup 12 and not rise as high as the supporting plate 10 upon which the spring motor is mounted.

The baffle plate 13 is of sufficient diameter to fit a standard sized mouth of a receptacle 15.

In assembling my device, the spring motor is mounted upon the plate 10 and the cup 12 is attached to the plate 10. The casing 6 is formed with a flange 16 while the baffle plate 13 is formed with an upstanding flange 17. The plate 10 is brought into contact with the baffle plate 13 and the casing 6 is placed so that flange 16 rests upon the plate 10 and abuts the flange 17, after which the flange 17 is spun over the flange 16, as shown in Fig. 2, to securely hold the parts together. This method of assembly obviously is very simple, and at the same time provides a compact and sturdy structure.

The spring motor enclosed in the casing is provided with a winding spring 18 which is connected to the winding shaft 7, the latter having fixed thereto a gear 19 in mesh with a pinion 20 attached to a small shaft 21 upon which is mounted a gear 22 in mesh with pinion 23 attached to shaft 24 on which is mounted a large gear 25 engaging the pinion 26 to which is attached the shaft 9. The structure of the spring motor is common and well-known in the art.

In operation, the spring motor is wound by means of knob 8 and winding shaft 7, and the brake 27 is moved to an out-of-the-way position to allow free rotation of the pinion 26 through which rotary movement is transmitted to shaft 9 and stirrer 11.

From the above description it will be seen that I have provided an unusually compact and simple structure which is rigid and not susceptible to being easily bent or distorted.

The foregoing disclosure is to be regarded as descriptive and illustrative only, and not as restrictive or limitative of the invention, of which obviously an embodiment may be constructed including many modifications without departing from the general scope herein indicated and denoted in the appended claims.

Having thus described my invention, what I claim as new and desire to secure by Letters Patent, is:

1. In a mixing apparatus, a receptacle containing the substances being mixed, a stirrer positioned in the receptacle, a spring motor for rotating the stirrer, a casing in which the spring motor is positioned, a plate on which the motor is mounted, said casing having a flange resting upon the plate, a reenforcing cup-shaped member depending from the bottom of the plate, a baffle plate having a portion shaped to conform with and engaging the cup-shaped reenforcing member, said baffle plate having another portion shaped to fit within and engage the receptacle and a third portion resting upon the receptacle, and a flange projecting upwardly from said baffle plate, said flange being spun over the flange on the casing, whereby the baffle plate and the motor supporting plate and the casing are positively secured together.

2. In a beverage mixing apparatus, a supporting plate, a spring motor mounted on the plate, a casing having a flange resting on said plate, a reenforcing member depending from the bottom of said plate, a baffle plate having a portion shaped to conform with and engaging said reenforcing member, and a flange extending upwardly from said baffle plate, said flange being over the flange on the casing and the supporting plate to securely hold the parts together.

3. In a beverage mixing apparatus, a supporting plate, a spring motor mounted on said plate, a casing covering said spring motor and having a flange resting on said plate, a reenforcing member depending from said supporting plate, a baffle plate having substantially the same shape as and engaging the reenforcing member, said baffle plate having a portion adapted to engage the inner walls of a receptacle, and an upstanding flange on said baffle plate, said flange being bent over the flange on the casing to secure the parts together.

SAMUEL I. BERGER.